United States Patent Office 3,072,495
Patented Jan. 8, 1963

3,072,495
CORROSION-INHIBITIVE PIGMENT
Adrian R. Pitrot, Uniondale, N.Y., assignor to National Lead Company, New York, N.Y., a corporation of New Jersey
No Drawing. Filed Apr. 20, 1960, Ser. No. 23,378
11 Claims. (Cl. 106—296)

This invention relates to novel corrosion-inhibitive pigments.

Basic chromates of lead and zinc have long been considered as being superior metal protective paint pigments for combatting corrosion, particularly of iron and steel.

The principal objects of this invention is to provide pigments which have the superior corrosion inhibitive properties of the basic chromates of lead and zinc, but which are more economical to manufacture.

Broadly, this invention contemplates a pigmentary composition comprising particles of silica coated with cocalcined oxidic compounds of zinc and chromium.

In a particularly desirable embodiment, this invention contemplates a pigmentary composition comprising particles of silica coated with cocalcined oxidic compounds of zinc, chromium and lead.

The pigmentary compositions of this invention may be made by calcining finely-divided silica with an oxidic compound of zinc and an oxidic compound of chromium, and if desired, an oxidic compound of lead. By the term "oxidic compound" we mean an oxide or a compound which upon calcination yields an oxide—for example a hydroxide, an organic acid salt or the like. Preferably the oxides themselves are employed, and we prefer to use chromium trioxide, $CrO_3$, zinc oxide, $ZnO$, and litharge, $PbO$, rather than other oxides of the respective metals. Instead of pure $CrO_3$, we may use proportions of $CrO_3$ and $K_2Cr_2O_7$ to approximate the proportions of commercial zinc yellow.

Further replacement of $CrO_3$ with $K_2Cr_2O_7$, with a higher proportion of $K_2Cr_2O_7$ than is found in zinc yellow, is not desirable since the pigments formed are inferior to those contemplated by this invention when produced by the procedure outlined in the examples.

The silica core may be any finely-divided silica, preferably having an average particle size of about 5 microns diameter, and may be prepared by precipitation from a silicate solution, by ignition of organosilicon compounds, by combustion of volatile compounds such as $SiCl_4$, or in other ways which will be obvious to those skilled in the art. For economy and simplicity, however, we prefer to employ finely-divided native silica. The silica may be ground and then blended with the oxides of zinc and chromium, but is preferably ground with them, for example by ball-milling the silica with chromic anhydride, zinc oxide and, if desired, litharge. Carrying out the grinding and blending simultaneously in this way results in intimate contact of the metal oxides with the silica particles.

The calcination step performs two functions. It forms a physico chemical bond of metal oxide coating materials to the surface of the silica core, and it completes the chemical reaction between the coating oxides, that is the chromium oxides, zinc oxide and if present, lead oxide. In fact, it is believed that the coating oxides react among themselves to form compounds such as zinc chromites, zinc chromates, lead chromates, zinc plumbates and the like, depending in part on the calcination temperature and the proportions of coating oxides present.

The calcination should be at a temperature between 500 and 750° C., and for a length of time between about 1 and about 2 hours. Although some variation in these conditions is permissible, overcalcination should be avoided, because it leads to agglomeration and particle growth, resulting in a gritty pigment of poor pigmentary properties. Undercalcination, on the other hand, results in incomplete reaction and poor adherence of the coating to the silica core. When the pigment is calcined the chromium is partly reduced to a valence state lower than the hexavalent state, resulting in the formation of chromites, chromous salts or oxides and the like, rather than chromates or chromic compounds.

In the preparation of the preferred pigments of this invention, i.e. those containing oxidic compounds of lead in addition to the chromium and zinc compounds, the lead oxide or the like may be introduced after the grinding of the silica with the chromium and zinc compounds, or the chromium, zinc and lead oxidic compounds may all be ground together with the silica in a single operation.

The relative proportions of silica, chromium, zinc and lead should be within the following ranges:

| | Percent |
|---|---|
| Silica | 25–75 |
| Chromic oxide | 12–38 |
| ZnO | 12–35 |
| PbO | 0–36 |
| $K_2O$ | 0– 9 |

Pigments containing greater than 75% silica or less than 12% chromic oxide and 12% zinc oxide, show limited effectiveness because of dilution of the active ingredients. Similarly, pigments containing less than 25% silica, or greater than 38% chromic oxide, 35% zinc oxide, 36% lead oxide, 9% potassium oxide yield products that are more expensive without a compensating increase in effectiveness.

In preparing the intimate mixtures in aqueous suspension it is advantageous to add a small proportion of a solution catalyst such as acetic or sulfuric acid, causing reactions to facilitate the precipitation of zinc and/or lead salts in the presence of finely divided silica.

It will be appreciated that proportions of zinc oxide, chromium compound and/or lead monoxide employed will govern the basicity and composition of the product formed. The temperature of calcination may be between about 500° C. and 750° C., with the preferred range for all products of from 625° C. to 675° C.

In order that the invention may be more clearly understood, the following examples of the preparation of the pigments of this invention are offered.

EXAMPLE I 4000 grams of finely ground silica were placed in a large cylindrical glass jar containing 16 liters of water, equipped with a stirring device, and 9 grams of sulfuric acid were added; 3218 grams of zinc oxide were then added and while maintaining constant stirring, 797 grams of chromic acid dissolved in 4 liters of water were slowly and uniformly added over a period of 3 hours. The thickened slurry was filtered, dried and calcined in an electric muffle furnace, at a calcining temperature of 625° C. for 2 hours. The product was found to possess a desirable, soft texture, gray in color.

After being disagglomerated in a swing hammer mill the pigment was formulated into a metal protective paint using 59.2 by weight of a vehicle comprising 78% alkyd resin and 22% thinner with drier, and into metal protective paints using 52.6% by weight of a vehicle comprising 72% phenolic varnish and 28% thinner and drier. Painted panels of cleaned cold rolled steel were exposed in alternate exposure to 100% humidity and a 5% salt fog, in comparative fashion with basic zinc chromate.

The zinc chromate coated silica was found to possess excellent rust inhibitive and blistering resistance properties when formulated into a paint and applied to panels of cleaned cold rolled steel as compared to a control of basic zinc chromate. Examples of the paint formulations that were compared are found in Table I.

*Table I*

FORMULATIONS OF METAL PROTECTIVE PAINTS

| | Control 1 | Test 1 | Control 2 | Test 2 |
|---|---|---|---|---|
| Percent pigment | 40.8 | 40.8 | 47.4 | 47.4 |
| Pigment composition: | | | | |
| Basic zinc chromate lbs./100 gal | 150 | | 355 | |
| Zinc chromate coated silica lbs./100 gal | | 438 | | 538 |
| Ground quartz do | 288 | | 183 | |
| Bentone 38 do | 5 | 5 | 4 | 4 |
| Percent vehicle | 59.2 | 59.2 | 52.6 | 52.6 |
| Vehicle composition: | | | | |
| Alkyd resin solution ("Glyptal 2458") lbs./100 gal | 500 | 500 | | |
| Phenolic varnish do | | | 428 | 428 |
| Volatile petroleum solvent lbs./100 gal | 131 | 131 | 166.6 | 166.6 |
| 24% Pb naphthenate do | 5 | 5 | 1.4 | 1.4 |
| 6% Co naphthenate do | 2 | 2 | 0.3 | 0.3 |
| 6% Mn naphthenate do | | | 0.3 | 0.3 |
| Methanol do | 1.5 | 1.5 | 1.2 | 1.2 |

The alkyd resin used was a medium oil length alkyd resin solution comprising 50% non-volatile solids. The solids show approxmiately 32% phthalic anhydride, 49% fatty acids and the remaining 19% polyhydroxy alcohols and modifiers.

The phenolic varnish consisted of 25 gallons of tung oil modified with 100 pounds of Bakelite resin 4036. The resin 4036 is a para-tert. amylphenolformaldehyde resin. The varnish was approximately 60% solids by weight diluted with mineral spirits.

Bentone 38 is an organophilic bentonite prepared by the reaction of bentonite with an aliphatic ammonium salt.

The painted panels were then exposed and tested for under film corrosion resistance and blistering resistance.

*Table II*

UNDER FILM CORROSION RESISTANCE TEST

| Paint formulation | 100% humidity, 95° F. | | 5% salt fog, 92-97° F. | |
|---|---|---|---|---|
| | Days | Rating | Days | Rating |
| Control 1 | 51 | 4-1 | 42 | 4-1 |
| Test 1 | 51 | 8-1 | 42 | 6-1 |
| Control 2 | 51 | 7-1 | | |
| Test 2 | 51 | 8-1 | | |

*Table III*

BLISTERING RESISTANCE TEST

| Paint formulation | 100% humidity, 95° F. | |
|---|---|---|
| | Days | Rating |
| Control 2 | 6 | 4MD |
| Test 2 | 13 | 8M |

The aforementioned tests and numerical ratings found in Tables II and III were conducted according to ASTM D-610-43 (rusting) and ASTM D-714-56 (blistering). Numerical ratings for corrosion and blistering are based on physical appearance giving a rating of 10 if perfect and of 0 if there is complete failure.

The above tabled results demonstrate the superior properties of the present invention as compared to basic zinc chromate in both underfilm resistance and blistering resistance.

EXAMPLE II (A) The following basic lead chromate-silicate preparation will be designated 1 MZ.

3415.5 grams of silica was ground in a 4 gallon pebble mill with 2135 ml. of water and 20 pounds of pebbles for 16 hours. It was then transferred to a 12" x 18" cylindrical jar equipped with baffles and an agitator. 346.1 grams of litharge was added to the jar followed by 10.865 liters of water and 8.5 grams of acetic acid. 386.4 grams of chromic oxide was dissolved in 2 liters of water and slowly added to the agitated slurry over a period of 4 hours. The slurry was set aside for use in later preparations.

(B) The following basic lead chromate-silicate preparation will be designated 2 MZ.

This preparation was conducted as in 1 MZ, with ⅔ the charge.

(C) The following zinc yellow-silicate preparation will be designated 3 MZ.

3415.5 grams of silica was ground in a 4 gallon pebble mill with 2135 ml. of water and 20 pounds of pebbles for 16 hours. To this, additional silica was added bringing the total weight of silica to 4000 grams. The silica slurry was then transferred to a 12" x 18" cylindrical jar equipped with baffles and an agitator. 1585.5 grams of zinc oxide and 3.97 grams of sulfuric acid were then added to the slurry. 1446.5 grams of potassium dichromate was dissolved in 9 liters of warm water and then 978.5 grams of chromic trioxide was dissolved in this solution. This solution was then added slowly to the agitated slurry over a period of three hours. The slurry was reserved for later preparations.

(D) The following basic zinc chomate-silicate preparation will be designated 4 MZ.

4000 grams of silica was ground and transferred to a 12" x 18" cylindrical jar using the same method of preparation as in 3 MZ. 3218.3 grams of zinc oxide and 9 grams of sulfuric acid were then added to the slurry. 797.2 grams of chromic trioxide was dissolved in 4 liters of water and slowly added to the agitated slurry over a period of three hours. The slurry was reserved for later preparations.

It will be noted in the subsequent preparations, E thru H, the pigmentary composition will contain 50% coated silica and that the percent metal salts are in relation to each other.

(E) The following 25% zinc yellow—75% basic lead chromate coated silica preparation will be designated 5 MZ.

To a 15% portion of preparation 3MZ, which contained 1202.2 grams solids, 30% of the combined slurries of preparations 1MZ and 2MZ, which contained 3606.6 grams solids, were added. This was then agitated, filtered, dried and calcined at a temperature of 625° C. for 2 hours. The product was then disagglomerated.

(F) The following 50% zinc yellow—50% basic lead chromate coated silica preparation will be designated 6 MZ.

To a 30% portion of preparation 3 MZ, which contained 2404.4 grams solids, 20% of the combined slurries of preparations 1 MZ and 2 MZ, which contained 2404.4 grams solids, were added. The same method of preparation as in 5MZ was followed.

(G) The following 25% basic zinc chromate—75% basic lead chromate coated silica preparation will be designated 7 MZ.

The same method of preparation as 5 MZ was followed, except a 15% portion of preparation 4 MZ was substituted for preparation 3 MZ.

(H) The following 50% basic zinc chromate—50% basic lead chromate coated silica preparation will be designated 8 MZ.

The same method of preparation as 6 MZ was followed, except a 30% portion of preparation 4 MZ was substituted for preparation 3 MZ.

Preparations 5 MZ, 6 MZ, 7 MZ and 8 MZ were formulated into metal protective paints of linseed oil and driers (Table IV), and an alkyd resin and driers (Table VII). The exposures were made on sandblasted 6" x 12"—12 gauge hot rolled steel panels.

Table IV
FORMULATIONS OF METAL PROTECTIVE PAINTS

|  | Control 3 | Test 3 | Test 4 | Test 5 | Test 6 |
|---|---|---|---|---|---|
| Percent pigment | 59.2 | 65.6 | 62.3 | 65.2 | 64.8 |
| Pigment composition: |  |  |  |  |  |
| Basic zinc chromate pounds | 99.0 |  |  |  |  |
| 5 MZ do |  | 99.4 |  |  |  |
| 6 MZ do |  |  | 99.4 |  |  |
| 7 MZ do |  |  |  | 99.4 |  |
| 8 MZ do |  |  |  |  | 99.4 |
| Aluminum stearate pounds | 1.0 |  |  |  |  |
| Bentone 38 do |  | 0.6 | 0.6 | 0.6 | 0.6 |
| Percent vehicle | 41.8 | 34.4 | 37.7 | 34.8 | 35.2 |
| Vehicle Composition: |  |  |  |  |  |
| Raw linseed oil do | 49.1 | 63.7 | 63.7 | 63.7 | 63.7 |
| PHBZ₂ linseed #555 do | 17.0 | 22.1 | 22.1 | 22.1 | 22.1 |
| Volatile petroleum solvent do | 29.0 | 4.5 | 4.5 | 4.5 | 4.5 |
| DB drier do | 4.9 | 6.5 | 6.5 | 6.5 | 6.5 |
| Methanol do |  | .4 | .4 | .4 | .4 |
| Turpentine do |  | 2.8 | 2.8 | 2.8 | 2.8 |

PHBZ₂ linseed #555 is a pale heat bodied linseed oil with a Z₂ viscosity. DB drier is a Dutch Boy drier containing 5% Pb, .05% Co, 6% Mn driers in mineral spirits.

Table V shows the results of the half tide corrosion resistance tests of a number of experimental silica core pigments with zinc-lead chromate coatings in primer paints using basic zinc chromate as a control in a linseed oil vehicle. The following painting system was used in a half tide water immersion of the panels: two coats of primer overall, finish coat over all. The finish coat used on all tested panels was a basic lead silico chromate pigment in a linseed oil-alkyd resin vehicle paint. All coats were applied at 2 mils dry film thickness.

Table V
CORROSION RESISTANCE AT HALF TIDE—12 MONTHS EXPOSURE

| Paint | Pigment | Grams lost due to corrosion |
|---|---|---|
| Control 3 | Basic zinc chromate | 7.2 |
| Test 4 | 6 MZ | 6.3 |
| Test 5 | 7 MZ | 6.0 |
| Test 6 | 8 MZ | 5.0 |

The results of the 12 month half tide exposure (Table V) show that the panels painted with the zinc-lead chromate coated silica had less metal lost due to corrosion, i.e. 6.3, 6.0, 5.0 grams, than the panel painted with the basic zinc chromate, 7.2 grams.

Table VI lists the results found following a two and one-half feet above tide corrosion resistance exposure of the experimental zinc-lead chromate coated silica and a control of basic zinc chromate with linseed oil vehicle. The paint system used was: one coat primer over all, second coat primer on upper half of panel. All coats were applied at 2 mils dry film thickness.

Table VI
CORROSION RESISTANCE TWO AND ONE-HALF FEET ABOVE TIDE—22 MONTHS

| Paint | Pigment | Corrosion rating |
|---|---|---|
| Control 3 | Basic zinc chromate | 4 |
| Test 3 | 5 MZ | 9 |
| Test 4 | 6 MZ | 7 |
| Test 5 | 7 MZ | 9 |
| Test 6 | 8 MZ | 9 |

The corrosion resistance test and numerical ratings, found in Table VI, are based on physical appearance. A rating of 10 is perfect and 0 for complete failure.

All of the zinc-lead chromate coated silica pigments were superior in corrosion resistance as compared to basic zinc chromate; ratings of 9, 7, 9, and 9 as against 4.

The same group of experimental silica core pigments with chromate coatings were exposed with alkyd vehicles. Table VII reveals the metal protective paint formulations.

Table VII
FORMULATIONS OF METAL PROTECTIVE PAINTS

|  | Control 4 | Test 7 | Test 8 | Test 9 | Test 10 |
|---|---|---|---|---|---|
| Percent pigment | 47.4 | 51.2 | 46.9 | 48.9 | 51.8 |
| Pigment composition: |  |  |  |  |  |
| Basic zinc chromate pounds | 50 |  |  |  |  |
| Zinc oxide do | 17.2 |  |  |  |  |
| Raw sienna do | 4.5 |  |  |  |  |
| Rutile TiO₂ do | 13.6 |  |  |  |  |
| Fibrous magnesium silicate pounds | 13.6 |  |  |  |  |
| Aluminum stearate do | 1.1 |  |  |  |  |
| 5 MZ do |  | 99.1 |  |  |  |
| 6 MZ do |  |  | 98.9 |  |  |
| 7 MZ do |  |  |  | 99.0 |  |
| 8 MZ do |  |  |  |  | 99.1 |
| Bentone 38 do |  | 0.9 | 1.1 | 1.0 | 0.9 |
| Percent vehicle | 52.6 | 48.8 | 53.1 | 51.1 | 48.2 |
| Vehicle composition: |  |  |  |  |  |
| Alkyd resin solution ("Glyptal 2466") pounds | 56.0 | 65.8 | 65.8 | 63.2 | 68.9 |
| Volatile petroleum solvent pounds | 38.1 | 31.9 | 31.9 | 34.7 | 28.8 |
| 6% Co Naphthenate pounds | .2 | .4 | .4 | .4 | .4 |
| 24% Pb Naphthenate pounds | 1.9 | 1.0 | 1.0 | 1.0 | 1.0 |
| Butyral doxime pounds |  | .6 | .6 | .5 | .6 |
| 6% Mn Naphthenate pounds | .2 |  |  |  |  |
| Dipentene do | 3.6 |  |  |  |  |
| Methanol do |  | .3 | .3 | .3 | .3 |

NOTE.—Control 4, Tests 7, 8, 9 and 10 all contain approximately equal amounts of active metal protective paint pigment.

Raw Sienna is a natural occurring earth pigment of magnesium and iron oxides. The alkyd resin used consisted of 30% mineral spirits and 70% solids of which 25% was phthalic anhydride, 60% fatty acids and the remaining 15% was polyhydroxy alcohols and modifiers.

In this test the zinc-lead chromate coated silica pigments were compared to basic zinc chromate in half tide immersion of the panels for corrosion resistance. The following paint system was used: two coats primer over all, finish coat over all. A gray white lead-zinc oxide phenolic varnish paint was used as the finish coat. All paints were applied at 2 mils dry film thickness per coat. The results are shown in Table VIII which lists the amounts of metal lost due to corrosion.

Table VIII
CORROSION RESISTANCE OF HALF TIDE—21 MONTHS EXPOSURE

| Paint | Pigment | Grams lost due to corrosion |
|---|---|---|
| Control 4 | Basic zinc chromate | 6.2 |
| Test 8 | 6 MZ | 5.8 |
| Test 9 | 7 MZ | 4.9 |
| Test 10 | 8 MZ | 3.8 |

The zinc-lead chromate coated silica demonstrated their superior corrosion resistance after 21 months exposure by limiting the amount of metal lost to 5.8, 4.9 and 3.8 grams as compared to the 6.2 grams lost by the basic zinc chromate.

Corrosion resistance two and one-half feet above tide exposure test results comparing the zinc-lead chromate coated silica vs. basic zinc chromate are found in Table IX. The paint system used was: one coat primer over all, second coat primer on upper half. All paints were applied at 2 mils dry film thickness.

Table IX
CORROSION RESISTANCE TWO AND ONE-HALF FEET ABOVE TIDE—22 MONTHS

| Paint | Pigment | Corrosion rating |
|---|---|---|
| Control 4 | Basic zinc chromate | 6 |
| Test 7 | 5 MZ | 9 |
| Test 9 | 7 MZ | 9 |
| Test 10 | 8 MZ | 9 |

The corrosion resistance test and numerical ratings found in Table II are based on a system where a perfect physical appearance would be given a numerical rating of 10, and in the case of complete failure, 0.

The zinc-lead chromate coated silica pigments have successfully deferred any appreciable corrosion as evidenced by corrosion ratings of 9 for all test paints, and showed themselves to be superior to a panel painted with basic zinc chromate which had a rating of 6.

While this invention has been described by way of certain preferred embodiments and illustrated by specific examples, these are illustrative only, and the invention is not to be construed as limited except as set forth in the appended claims.

I claim:

1. A pigmented composition containing particles of silica coated with cocalcined oxidic compounds of zinc and chromium, said silica present from about 25% to 75%, said oxidic compound of zinc present from about 12% to about 35%, and said oxidic compound of chromium present from about 12% to about 38% based on the total weight of the particle.

2. A pigmented composition containing particles of silica coated with cocalcined oxidic compounds of zinc, chromium and lead, said silica present from about 25% to about 75%, said oxidic compound of zinc present from about 12% to about 35%, said oxidic compound of chromium present from about 12% to about 38% and said oxidic compound of lead present in an amount not substantially greater than 36% based on the total weight of the particle.

3. A pigmentary composition comprising particles of silica coated with the following cocalcined oxide compounds: Chromic oxide 12–38%, zinc oxide 12–35%, lead oxide 0–36% and potassium oxide 0–9%, and silica 25–75%, in which all percents are based on the total weight of the composition.

4. A pigment particle consisting essentially of silica coated with cocalcined oxidic compounds of zinc and chromium, said silica present from about 25% to about 75%, said oxidic compound of zinc present from about 12% to about 35%, and said oxidic compound of chromium present from about 12% to about 38% based on the total weight of the particle.

5. A pigment particle consisting essentially of silica coated with cocalcined oxidic compounds of zinc, chromium, and lead, said silica present from about 25% to about 75%, said oxidic compound of zinc present from about 12% to about 35%, said oxidic compound of chromium present from about 12% to about 38% and said oxidic compound of lead present in an amount not substantially greater than 36% based on the total weight of the particle.

6. A pigment particle consisting essentially of silica coated with cocalcined oxidic compounds of zinc, chromium, and potassium said silica present from about 25% to about 75%, said oxidic compound of zinc present from about 12% to about 35%, said oxidic compound of chromium present from about 12% to 38% and said oxidic compound of potassium present in an amount not substantially greater than 9% based on the total weight of the particle.

7. A pigment particle consisting essentially of silica coated with cocalcined oxidic compounds of zinc, chromium, lead and potassium, said silica present from about 25% to about 75%, said oxidic compound of zinc present from about 12% to about 35%, said oxidic compound of chromium present from about 12% to about 38%, said oxidic compound of lead present in an amount not substantially greater than 36% and said oxidic compound of potassium present in an amount not substantially greater than 9% based on the total weight of the particle.

8. A paint composition containing a pigment particle according to claim 4.

9. A paint composition containing a pigment particle according to claim 5.

10. A paint composition containing a pigment particle according to claim 6.

11. A paint composition containing a pigment particle according to claim 7.

References Cited in the file of this patent

UNITED STATES PATENTS

| | | |
|---|---|---|
| 2,001,448 | Beasley | May 14, 1935 |
| 2,068,294 | Korinth et al. | Jan. 19, 1937 |
| 2,415,394 | Tarr et al. | Feb. 4, 1947 |
| 2,668,122 | Pitrot | Feb. 2, 1954 |
| 3,004,857 | Merson et al. | Oct. 17, 1961 |

FOREIGN PATENTS

| | | |
|---|---|---|
| 272,582 | Great Britain | June 10, 1927 |
| 404,041 | Great Britain | Jan. 11, 1934 |